No. 710,202. Patented Sept. 30, 1902.
H. D. MEIER.
VARIABLE MOVEMENT CONTROLLING MECHANISM
(Application filed July 22, 1901.)
(No Model.) 2 Sheets—Sheet 2.
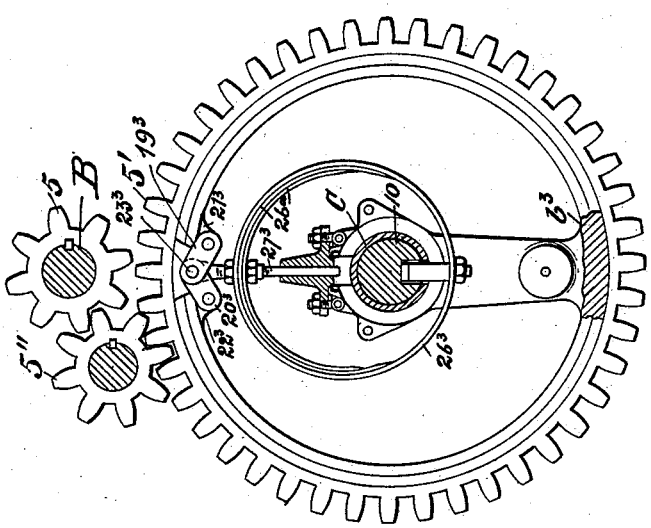
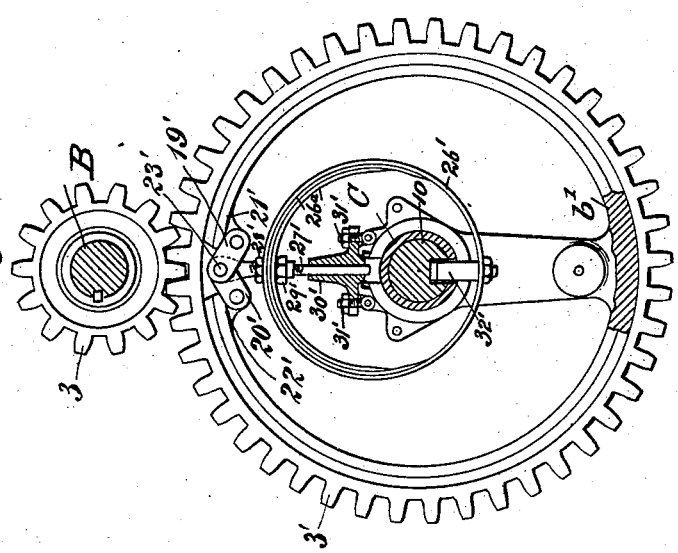
WITNESSES:
L. N. Legendre
E. A. Jarvis
INVENTOR,
Hugh D. Meier,
BY Pierson L. Wells
HIS ATTORNEY

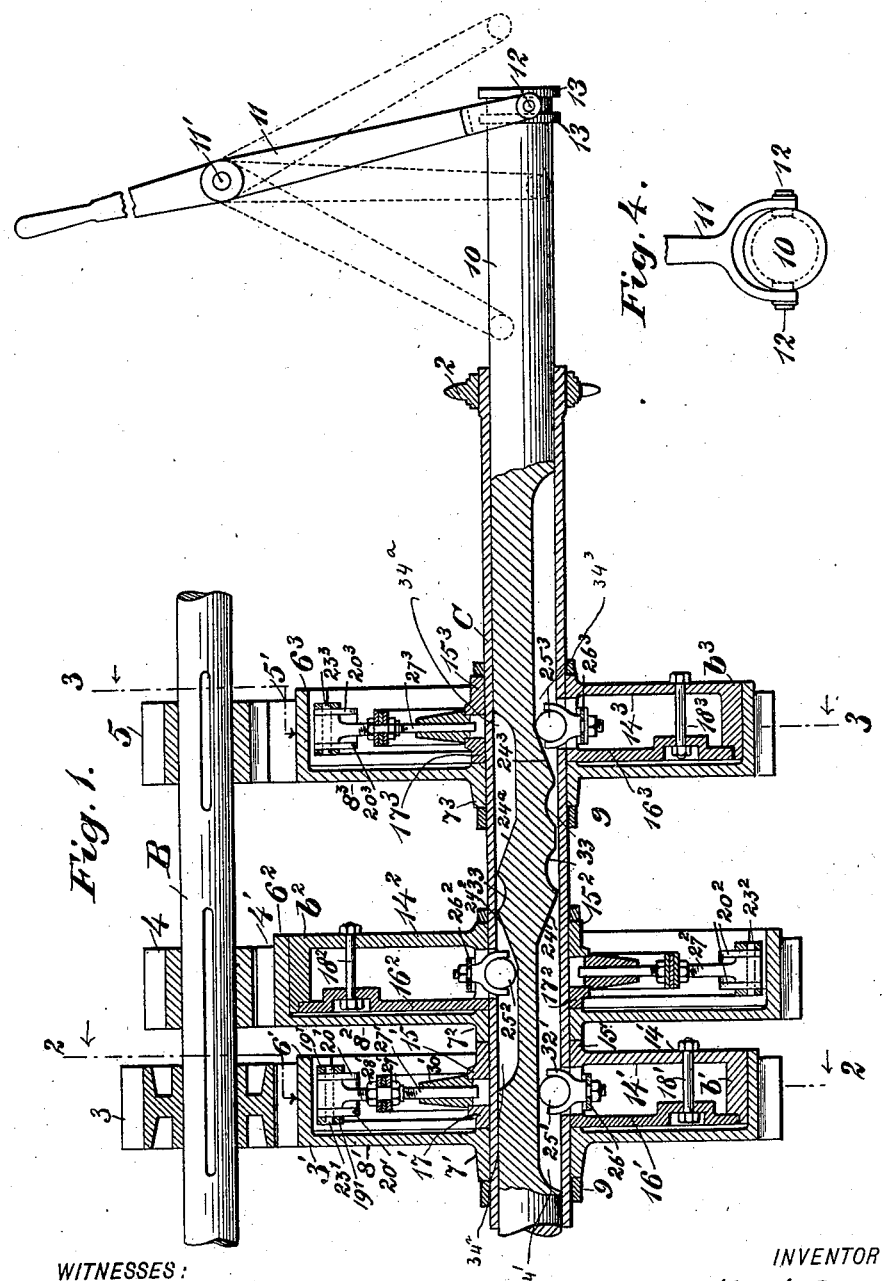

UNITED STATES PATENT OFFICE.

HUGH D. MEIER, OF BROOKLYN, NEW YORK.

VARIABLE-MOVEMENT-CONTROLLING MECHANISM.

SPECIFICATION forming part of Letters Patent No. 710,202, dated September 30, 1902.

Application filed July 22, 1901. Serial No. 69,305. (No model.)

*To all whom it may concern:*

Be it known that I, HUGH D. MEIER, of the borough of Brooklyn, city and State of New York, have invented a certain new and useful Improvement in Variable-Movement-Controlling Mechanism, of which the following is a specification.

This invention relates to a device for connecting a driving member or shaft with and disconnecting it from a second member at will, whereby the said driving member may be rendered operative or inoperative to transmit motion to the second member.

The invention furthermore embodies a plurality of such devices severally capable of rendering at will the said driving member effective or ineffective as a driver, and when the relation of the parts is such as to cause different ratios of speed to be impartable from the driving member to the second member when the two are in operative connection the present invention provides a means for varying at will the speed either in one direction or the other, or in both directions of, the second member. The invention thus furnishes a means for controlling the speed in either direction at which a car or other vehicle—such, for instance, as an automobile—may be driven.

An organization is also included in the present improvements, whereby the various changes in relationship requisite for effecting changes in speed may be accomplished by a simple movement of a hand-operated part—such, for instance, as a hand-lever—thus particularly fitting a device embodying the present invention to application as a variable-speed-controlling mechanism for use in mechanically-propelled vehicles.

In the drawings accompanying this specification there is set forth an embodiment of the present variable-movement-controlling mechanism, and in these drawings—

Figure 1 is a longitudinal section through such embodiment, showing the same applied to the purposes of a variable-speed-controlling mechanism, parts, however, being shown in elevation. Fig. 2 is a sectional view, the plane of the section being that indicated by the line 2 2 in Fig. 1, and the section being viewed in the direction of the arrow adjacent to that line, a part being broken away. Fig. 3 is also a section, the plane of the section being that indicated by the line 3 3 in Fig. 1 and the section being viewed in the direction of the arrow adjacent to that line, a part being broken away and parts lying beyond the plane of the section being omitted. Fig. 4 is an end elevation of the parts at the right of Fig. 1.

Similar characters of reference designate corresponding parts in all figures.

The driving member hereinbefore referred to is in the present illustrated embodiment shown as a shaft and designated in a general way by B. This shaft is mounted in any desired and appropriate manner, the bearings therefor not being illustrated, while it may be rotated directly or indirectly from an appropriate source of power, (not shown)—such, for instance, as the vehicle-motor when the device is utilized as a variable-speed-controlling mechanism.

The member hereinbefore referred to as the "second" member is also in the present illustrated embodiment shown as a shaft and designated in a general way by C. While with respect to the driving-shaft B it constitutes a driven member, it will in the practical use of the device ordinarily act as a driver for imparting motion, and will therefore usually be supplied with some means for this purpose. A sprocket-wheel 2 is shown secured to the shaft, but it is obvious that an equivalent device may be employed, dependent upon the character of the mechanical transmission desired.

For the operative connection of the driver B with the driven member C and its disconnection therefrom I provide a friction-clutch of novel construction, which may be utilized simply as a means, and herein is embodied one feature of my present invention, for rendering a driver operative to actuate a second member and for disconnecting it therefrom. When disconnected the one from the other by reason of said clutch assuming its idle or inoperative position, the driver B, even though it be in continuous rotation, is ineffective to impart any motion to the shaft C, and hence the sprocket 2, which latter may therefore remain at rest while the shaft B continues its movement.

Ordinarily a controlling mechanism when used on a vehicle must be capable of varying the speed thereof, and I have therefore provided a device susceptible by proper manipulation of varying the ratio of the speed of the driver B to that of the member C and its connected parts, the organization being such that not only may the driver be rendered inoperative at will to rotate the shaft C, but the ratio of the speed of the one to the other may be readily and promptly changed and the motion reversed, if desired. The speed-controlling device illustrated in the present drawings is capable of giving two changes of speed in one direction—for instance, in that direction corresponding to the forward movement of the vehicle—and one ratio in the reverse direction, (corresponding on this assumption to the backward motion of the vehicle.) It is evident, however, that the principle of the invention embraces within its scope other ratios than those resulting from the specific illustrated proportions of the parts and that a greater or less number of changes of speed, either in one direction or the other, or in both, may be provided for within the limits, of course, of mechanical construction.

For effecting the several changes of speed I provide a series of friction-clutches equal in number to the number of changes desired and combine with each such clutch a transmission device effective or ineffective to transmit motion between the members, dependent upon the position the clutch is caused to assume.

Proceeding now to a detailed description of the particular construction illustrated, each of the aforesaid transmission devices is shown in the form of a pair of spur-gears, the two pairs (designated by 3 3′ and 4 4′, respectively,) and situated at the left in Fig. 1 corresponding to the two speeds in one direction for effecting which the diameters of the two gears in each pair bear the requisite ratio to each other. The pinion-gears in the two sets, the gears 3 and 4, respectively, are appropriately fastened to the driving-shaft B. For instance, they may be keyed thereto, as shown, and they mesh with their respective companion gears 3′ and 4′, loosely mounted on the shaft C. A reverse motion of the shaft C is readily attained by interposing an intermediate gear between a pinion and its companion gear, this motion being accomplished by the gearing shown at the right in Fig. 1 and embodying a pinion 5, rigidly affixed to shaft B and engaging through a suitably-mounted intermediate 5″ (see Fig. 3) with its companion gear 5′, also loosely mounted on the shaft C. The relation of the diameters of the gears 5 and 5′ will of course be that required to give the desired ratio between the speeds of the two shafts B and C. Normally—that is, while each of the aforesaid friction-clutches is in its idle position—each of the pinions 3, 4, and 5 is free to rotate its companion gear about the shaft C during the rotation of the shaft B, and hence no motion of the shaft C will result. When, however, a clutch is actuated and the clutch members brought into frictional engagement with each other, the corresponding gear 3′, 4′, or 5′ becomes effective to rotate the shaft upon which it is mounted. Referring now to these clutches, the construction of all is similar in all respects and each embodies an expansible friction member, here shown substantially in the form of a ring mounted in the present device concentrically with respect to the shaft C and adapted when radially expanded to frictionally engage with an opposed surface, the ring of the clutch combined with the gear 3′ being designated by $b'$, that combined with the gear 4′ by $b^2$, and that with the gear 5′ by $b^3$. Each of the gears 3′, 4′, and 5′ is formed with an enlarged cylindrical recess in one of its side faces, in which recess the corresponding friction-ring is located, the friction-surfaces of the several rings when the latter are distended engaging with the coöperative surfaces presented by the walls 6′, $6^2$, and $6^3$, respectively, of the gears 3′, 4′, and 5′. These mentioned walls form the carrier portion for the teeth of the respective gears, the gears having hub portions 7′, $7^2$, and $7^3$ of proportions sufficient to provide ample bearing surfaces for the gears upon the shaft C. As shown, the teeth-carrying portions of the gears are connected by integral web-pieces 8′, $8^2$, and $8^3$, respectively, with their respective hub portions. The gears are so mounted upon the shaft C that they are each compelled to rotate in such a position axially of the shaft as to properly coöperate with their pinions, the means here employed for this purpose comprising collars 9 9, restraining the axial motion of the gears toward the left, while their axial motion in the opposite direction is prevented by the connection supporting the friction-rings upon the shaft C, as will presently appear.

Each of the friction-rings is substantially circular in form, having two opposed ends adjacent to each other and capable of being drawn together to contract the ring, and thereby release the corresponding gear, and, conversely, being forced apart to distend the ring, and thereby cause its frictional engagement with the opposed friction-surface.

As previously set forth, the present invention includes an organization such that any ratio of speed within the capacity of the machine may be obtained by a simple movement of a hand-operated part. In other words, an organization is provided whereby any pair of gears may at will be rendered operative to rotate the shaft C, it being possible to readily change from one pair to another by the simple movement of a controlling part, and in fact to disconnect the entire series of driven gears from the shaft C.

I find it convenient to locate the clutch-controlling device within the shaft C, and the latter is therefore shown as a tubular shaft, while the said controlling device is in the nature of an interior shaft or bar, (designated by 10,) and mounted in the tubular shaft C to move lengthwise therein. Its lengthwise movement serves to effect the various changes in the relative speed of the shaft C and to disconnect the same altogether from the driver B. In the particular embodiment shown there are four possible changes—to wit, two different speeds of the shaft C in the same direction, (corresponding to different forward velocities of the vehicle when the device is applied to propulsive purposes,) a neutral position, during which the shaft C is disconnected altogether from the shaft B, (corresponding to a disconnection of the vehicle-motor from the running-gear,) and one speed of the shaft C in the opposite direction, (corresponding to a backward movement of the vehicle.)

The actuation of the controlling-bar 10 will ordinarily be effected by some form of hand-operated device, and I have therefore indicated in a general way a hand-lever 11, fulcrumed intermediate its end, as at 11', to a convenient support. (Not shown.) Engagement between the working end of this lever and the controlling-bar is conveniently effected by pins 12 12, extending inwardly from the ends of the forked extremity of the lever 11 and entering a groove formed between collars 13 13 on the controlling-bar. This construction permits the rotation of the bar with the shaft C.

For the purpose of converting the to-and-fro longitudinal movement of the controlling-bar 10 into a movement of the ends of the friction-rings toward and away from each other the following is the preferred mechanical construction, it being premised that the mechanism for actuating one such ring is similar for all the other rings, and while for the sake of conciseness the description will refer mainly to the mechanism combined with the ring $b'$, for instance, it is equally applicable to the other clutches, equivalent parts in the several mechanisms being designated by the same numerals having dissimilar numerical exponents. With this explanation it may be stated that the friction-ring $b'$ is supported on the shaft C by an arm 14', located substantially diametrically opposite the ends of the friction-ring and having a hub portion 15' encircling the shaft and preferably rigidly affixed thereto. The inner edge of the friction-ring—that is, the edge nearest the web of the gear 3'—is shown as supported likewise by a similarly-located and stiffening arm 16', having a hub portion 17' encircling the shaft, while a fastening device, such as a bolt 18', secures the two arms and holds all the parts firmly together.

Motion is transmitted to the ends of the friction-ring $b'$ to cause their separation and the consequent distention of the ring through a toggle connection embodying a pair of links 19' and 20' at each side of the friction-ring, the links in each pair being hinged to ears 21' and 22', extending from the ring, and the two pairs of links being connected by a through-pin 23', to which the adjacent ends of each pair of links are pivoted.

Normally the ends of the friction-ring $b'$ are drawn together corresponding to the released position of the latter. For the purpose of straightening out the links embodied in each toggle connection and spreading the ends of the corresponding ring apart to cause the engagement of the latter with the friction-surface on the respective gear a separate sliding wedge is used for each ring movable in unison with the controlling-bar 10. In fact, such sliding wedges may be made in the bar itself, and they are here so represented. (See the surfaces $24'$ $24^2$, and $24^3$, adapted to effect the movement of the rings $b'$, $b^2$, and $b^3$, respectively.) Coöperable with each of these inclined surfaces is a suitable member, here shown to be a disk, (see $25'$, $25^2$, and $25^3$,) each of which disks is mounted to roll up the inclined surface with which it is combined, and thus move radially outward. This outward radial motion is transmitted to the proper toggle connection by appropriate means, preferably embodying a resilient or spring-like member as contradistinguished from a rigid one, since when the former is employed an amount of radial movement of the disk may occur in excess of that necessary to sufficiently spread the ring ends, this excess being taken up by the spring member, and thus providing a construction for automatically compensating for the wear of the friction and other surfaces. If such be the construction, therefore, the necessity for adjustment and the taking up of parts is avoided. In the construction shown this spring-like member consists in each instance of a circular spring, (see $26'$, $26^2$, and $26^3$, respectively,) each of which may be strengthened by one or more elastic leaves, such as $26^a$. Each of these circular springs encircles the shaft B, and the spring $26'$ is connected (and this construction is typical of the other springs) by a rod 27' with the corresponding toggle, this rod having in this instance an eye in its enlarged end, through which passes the before-mentioned through-pin. The rod extends through an opening in the spring and connected leaves, being secured therein by nuts 28' and 29' to permit the adjustment of the rod. At its inner end the rod 27' is guided in its to-and-fro movement in a socket formed in a fixture 30', rigid with the hub portions of the arms before described as extending from the friction-ring to the shaft C. This fixture may be secured in position by bolts 31' 31', as shown. To the opposite side of the spring member is affixed a saddle or socket 32', the latter being bolted to the spring and having a concave inner surface in which the disk 25' is seated, although readily rotatable when the controlling-bar is shifted to and fro. The disk and its socket extend through an opening in the hub portions of the said arms, and hence when the disk rides up the inclined surface with which it coöperates and is moved outward thereby the spring member tends to flatten, thus causing the engagement of the friction-ring with its opposed friction-surface by reason of the straightening out of the toggle. The ring, &c., now rotate with the gear, the disk and its socket acting as a key to drive the controlling-bar.

Preferably each inclined surface will have a detent portion adjacent to its extremity (see the depressions 33 in the bar) in which the corresponding disk may rest while the gears associated with that disk are operative to rotate the shaft C in order to eliminate the end thrust of the controlling-bar which would exist should the disk remain on the incline.

As before stated, four positions of the hand-lever are shown, corresponding to the two forward speeds, the idle condition of the shaft C, and the reverse motion thereof. It is furthermore apparent from what has already been described that any disk is inoperative to actuate its clutch when situated in the slot at the base of the inclined surface with which it coöperates. Hence the length of the slots will determine the longitudinal movement that may be given to the controlling-bar without connecting the gear with the shaft C. By properly proportioning and relating the slots, therefore, any particular set of gears may be rendered effective to drive the shaft, and hence the sprocket-wheel 2, in a given position of the hand-lever to the exclusion of the other sets. Thus if the lever be moved from the position it occupies in full lines in Fig. 1, in which all the clutches are disconnected, to the dotted position to the right the disk at the right will roll up the incline surface $24^3$ and the shaft C will be driven from the pinion 5, the disks at the left simply rolling along the bottom of their respective slots $34'$ and $34^2$. If, on the other hand, the lever is moved to the first dotted position at the left, the disk at the right will roll along the bottom of its slot $34^3$, while the middle disk will first roll up the incline surface $24^2$, ultimately seating itself in the depression 33, adjacent to such surface. If the shifting of the bar to the left is continued, the middle disk rides out of this depression, down the surface $24^a$, and into the slot $34^a$, disconnecting its clutch, whereupon the extreme disk at the left, having reached the end of its slot, ascends the inclined surface $24'$, ultimately seating itself in the depression 33, adjacent to that surface, if the lower end of the lever is caused to assume its extreme left-hand dotted position.

When organized and combined in the manner shown and described, the present invention provides a mechanism particularly applicable for use as a speed-controlling gear for motor-vehicles and possessing especial advantages when so employed. Thus it is apparent from the description that the entire series of driving-pinions may remain permanently in mesh with their respective driven gears, and when the controlling-bar is shifted to effect a certain speed no shock or jar results, since by reason of the possibility of slipping existing in each of the several friction-clutches the respective driven gears become gradually fixed one at a time with relation to the driven shaft. The device therefore operates noiselessly and without shock, permitting the use of gears of finer pitch than ordinarily used for similar devices in which such gears are suddenly thrown into mesh. It has already been stated that the present construction provides an amount of movement in excess of that necessary for bringing the friction-surfaces into coöperation, eliminating, therefore, the requirement of frequent and inconvenient adjustment of the parts.

The present invention presents other advantages, among others the facility which it offers for controlling the work of the motor, for not only are the various speeds derivable from a simple to-and-fro movement of a foot or hand operated part, but this movement also serves to disconnect the motor altogether from the running-gear, thus permitting the motor to be run continuously, irrespective of the fact whether it is or is not driving the vehicle. Furthermore, a simple movement in one direction of the controlling part suffices to give all the various and graduated speed relationships of which the device is capable—for instance, from highest to lowest in one direction, then a disconnection of the motor followed by the various relationships corresponding to movement in the reverse direction from the lowest to the highest speed, and vice versa for a contrary motion of such part.

Having described my invention, I claim—

1. The combination with a driving member and a driven member, of a shaft upon which one of the members is loosely mounted; a friction-ring adapted to engage said loosely-mounted member and thereby operatively connect the same with the shaft; a slidable wedge for actuating said ring and causing its engagement with its associated member; means for shifting said wedge to and fro axially of said shaft; and an intermediate connector extending between said wedge and said ring for transmitting motion from the former to the latter, said connector embodying an interposed resilient member whose resilient action is independent of that which the said ring may possess whereby the actuation of the ring occurs independently of the wear of the wedge and other parts.

2. The combination with a driving member and a driven member, of a shaft upon which one of the members is loosely mounted; a friction-ring adapted to engage said loosely-mounted member and thereby operatively connect the same with the shaft; a slidable wedge for actuating said ring and causing its engagement with its associated member; means for shifting the wedge to and fro axially of said shaft; a toggle device for expanding the ring; and an intermediate connector extending between said wedge and said toggle device for transmitting motion from the former to the latter, said connector embodying an interposed resilient member whose resilient action is independent of that which said ring may possess whereby the actuation of the ring occurs independently of the wear of the wedge and other parts.

3. The combination with a driving member and a driven member, of a shaft upon which one of the members is loosely mounted; a friction-ring adapted to engage said loosely-mounted member and thereby operatively connect the same with the shaft; a slidable wedge for actuating said ring and causing its engagement with its associated member; means for shifting the wedge to and fro axially of said shaft; a toggle device for expanding the ring; means for guiding the toggle device; and an intermediate connector extending between said wedge and said toggle device for transmitting motion from the former to the latter, said connector embodying an interposed resilient member whose resilient action is independent of that which said ring may possess whereby the actuation of the ring occurs independently of the wear of the wedge and other parts.

4. The combination with a driving member and a driven member, of a shaft upon which one of the members is loosely mounted; a friction-ring adapted to engage said loosely-mounted member and thereby operatively connect the same with the shaft; a slidable wedge for actuating said ring and causing its engagement with its associated member; means for shifting said wedge to and fro axially of said shaft; and an intermediate connector extending between said wedge and said ring for transmitting motion from the former to the latter, said connector embodying an interposed spring encircling said shaft whereby the actuation of the ring occurs independently of the wear of the wedge and other parts.

5. The combination with a driving member and a driven member, of a tubular shaft upon which one of the members is loosely mounted; a friction-ring adapted to engage said loosely-mounted member and thereby operatively connect the same with the tubular shaft; a rod extending through said tubular shaft and provided with an inclined surface; means for shifting the rod axially; a toggle device for expanding said ring; and an intermediate connector extending between said inclined surface and said toggle device for transmitting motion from the former to the latter, said connector embodying an interposed resilient member whose resilient action is independent of that which said ring may possess whereby the actuation of the ring occurs independently of the wear of the inclined surface and the other parts.

6. The combination with a driving member and a driven member, of a tubular shaft upon which one of the members is loosely mounted; a friction-ring adapted to engage said loosely-mounted member and thereby operatively connect the same with the tubular shaft; a rod extending through said tubular shaft and provided with an inclined surface; means for shifting the rod axially; a toggle device for expanding said ring; an intermediate connector extending between said inclined surface and said toggle device for transmitting motion from the former to the latter, said connector embodying an interposed resilient member whose resilient action is independent of that which said ring may possess whereby the actuation of the ring occurs independently of the wear of the inclined surface and the other parts; and means for locking said connector temporarily in position after the ring has been actuated.

7. The combination with a driving member and a driven member, of a tubular shaft upon which one of the members is loosely mounted; a friction-ring adapted to engage said loosely-mounted member and thereby operatively connect the same with the tubular shaft; a rod extending through said tubular shaft and provided with an inclined surface; means for shifting the rod axially; a toggle device for expanding said ring; an intermediate connector extending between said inclined surface and said toggle device for transmitting motion from the former to the latter, said connector embodying an interposed resilient member whose resilient action is independent of that which said ring may possess whereby the actuation of the ring occurs independently of the wear of the inclined surface and the other parts; and means for locking said connector temporarily in position after the ring has been actuated; embodying a depression adjacent to the upper end of the inclined surface and in which said connector may seat itself.

8. The combination with a driving member and a driven member, of a tubular shaft upon which one of said members is loosely mounted; a friction-ring adapted to engage said loosely-mounted member and thereby operatively connect the same with the tubular shaft; a rod extending through said tubular shaft and provided with a slot having an inclined end; a circular spring encircling said shaft; means engaging with the slot in said rod and which is mounted on said spring; a toggle device for expanding said ring; and a guided rod disposed on the opposite side of the shaft to the said means and jointed to the toggle device and connected to said spring.

9. The combination with a driving member and a driven member, of a tubular shaft upon which one of said members is loosely mounted, a friction-ring adapted to engage said loosely-mounted member and thereby operatively connect the same with the tubular shaft; a rod extending through said tubular shaft and provided with a slot having an inclined end, adjacent to which is a detent depression; a circular spring encircling said shaft; means engaging with the slot in said rod and which is mounted on said spring; a toggle device for expanding said ring; and a guided rod disposed on the opposite side of the shaft to the said means and jointed to the toggle device and connected to said spring.

10. The combination with a plurality of driving-pinions and driven gears of a tubular shaft upon which the driven gears are loosely mounted; friction-rings adapted to expand against the respective driven gears and operatively connect the same, one at a time, with the tubular shaft; a rod extending through the tubular shaft and provided with slots at different points circumferentially of the rod and which end in inclined surfaces; means for shifting said rod axially and thereby rendering the said inclined surfaces operative, one at a time; and intermediate connectors for transmitting motion from each inclined surface to each respective friction-ring, each connector embodying an interposed resilient member whose resilient action is independent of that which the ring may possess whereby the actuation of each respective ring occurs independently of the wear of the inclined surface and the other parts.

11. The combination with a driving-pinion and a driven gear, of a tubular shaft upon which the driven gear is loosely mounted; a friction-ring adapted to expand against said driven gear and thereby operatively connect the same with the tubular shaft; a rod extending through said tubular shaft and provided with an inclined surface; means for shifting said rod axially; toggle-links connected to the opposed ends of said friction-ring; a spring operatively connected to said links, and a friction-roller carried by said spring and adapted to move lengthwise of said inclined surface when said rod is shifted and thereby actuate the spring and expand said friction-ring.

12. The combination with a driving-pinion and a driven gear, of a tubular shaft upon which the driven gear is loosely mounted; a friction-ring adapted to expand outwardly against the inner wall of said driven gear and operatively connect the same with the tubular shaft; a rod extending through said tubular shaft and provided with an inclined surface; means for shifting said rod axially; toggle-links connected to the opposed ends of said friction-ring; a spring operatively connected to said links; a friction-roller adapted to bear against and move up the inclined surface when said rod is moved axially; and a socket secured to said spring in which said roller is seated.

13. The combination with a plurality of driving-pinions and driven gears of different diameters, of a tubular shaft upon which the driven gears are loosely mounted; friction-rings adapted to expand against the respective driven gears and operatively connect the same, one at a time, with the tubular shaft; a rod extending through said tubular shaft and provided with a series of inclined surfaces and adjacent slots and detent depressions; means for shifting said rod axially; toggle-links connecting together the opposed ends of each of said friction-rings; springs operatively connected one to each set of links, and friction-rollers carried by the respective springs and adapted to each move lengthwise of its respective inclined surface on said rod when the rod is shifted and thereby actuate the associated spring and expand its associated friction-ring.

14. The combination with a plurality of driving-pinions and driven gears of different diameters, of a tubular shaft upon which the driven gears are loosely mounted; friction-rings adapted to expand against the respective driven gears and operatively connect the same, one at a time, with the tubular shaft; a rod extending through said tubular shaft and provided with a series of inclined surfaces and adjacent slots and detent depressions; means for shifting said rod axially; toggle-links connecting together the opposed ends of each of said friction-rings; means for guiding said toggle-links in their movement; springs operatively connected one to each set of links; a bearing supported on each spring; and a friction-roller mounted in each bearing and extending through the tubular shaft and adapted to each move lengthwise of its slot in said tubular shaft and up its corresponding inclined surface on said rod when the rod is shifted, the detent depressions being effective to lock a roller in place upon a further movement of said rod.

15. The combination with a driving member and a driven member, of a shaft upon which one of the members is loosely mounted; a friction-ring adapted to engage said loosely-mounted member and thereby operatively connect the same with the shaft; a slidable wedge for actuating said ring and causing its engagement with its associated member; and an intermediate connector extending between said wedge and said ring for transmitting motion from the former to the latter and comprising a friction-roller adapted to bear against and move up the wedge when the latter is operated.

16. The combination with a driving member and a driven member, of a shaft upon which one of the members is loosely mounted; a friction-ring adapted to engage said loosely-mounted member and thereby operatively connect the same with the shaft; and means for actuating said ring to cause its engagement with its associated member, said means comprising an interposed resilient member whose resilient action is independent of that which the said ring may possess whereby the actuation of the ring occurs independently of the wear of the parts.

17. The combination with a driving member and a driven member, of a shaft upon which one of the members is loosely mounted; a friction-ring adapted to engage said loosely-mounted member and thereby operatively connect the same with the shaft; and means for actuating said ring to cause its engagement with its associated member, said means comprising an interposed toggle and a resilient member whose resilient action is independent of that which the said ring may possess whereby the actuation of the ring occurs independently of the wear of the parts.

In testimony whereof I have hereunto signed my name in the presence of two subscribing witnesses.

HUGH D. MEIER.

Witnesses:
DAVID CORBIN,
WARREN CORBIN.